April 24, 1956 T. A. SERAPHIN 2,742,789
FIELD STANDARD LIQUID VOLUMETRIC MEASURING DEVICE
Filed Nov. 2, 1953 2 Sheets-Sheet 1

FIG. I.

INVENTOR.
THEOPHILUS A. SERAPHIN
BY
ATTORNEYS

April 24, 1956    T. A. SERAPHIN    2,742,789
FIELD STANDARD LIQUID VOLUMETRIC MEASURING DEVICE
Filed Nov. 2, 1953    2 Sheets-Sheet 2

INVENTOR.
THEOPHILUS A. SERAPHIN
BY
ATTORNEYS

United States Patent Office 2,742,789
Patented Apr. 24, 1956

2,742,789

FIELD STANDARD LIQUID VOLUMETRIC MEASURING DEVICE

Theophilus A. Seraphin, Philadelphia, Pa.

Application November 2, 1953, Serial No. 389,743

1 Claim. (Cl. 73—427)

This invention relates to a field standard liquid volumetric measuring device of large capacity and, more particularly, to a semiportable apparatus for testing liquid measuring devices such as flow meters, tanks, calibrated pumps and the like of large capacities.

Heretofore volumetric measuring devices of large capacities have generally been mounted permanently on motor vehicle trucks or truck trailers. This type of mounting has presented considerable difficulty when the measuring device is moved from one location to another both with regard to the expense in maintaining the special carrier permanently associated with the measuring device and with regard to the difficulty of positioning such a carrier in the vicinity of the apparatus which is to be tested.

It is an object of this invention to provide a field standard volumetric measuring device of a semiportable nature which is provided with wheels in order that it may be moved short distances permitting placement adjacent to apparatus to be tested and which is also provided with a permanently attached skid in order that the device may be conveniently mounted on a flat truck and hauled from one location to another on the highways. This arrangement permits the hauling truck to be used for other purposes while the measuring device is being used for test or calibration purposes.

This and other objects of the invention providing an improvement in the testing apparatus disclosed in my Patent No. 2,031,230, issued February 18, 1936, will be described in greater detail in conjunction with the accompanying drawings in which.

Figure 1:
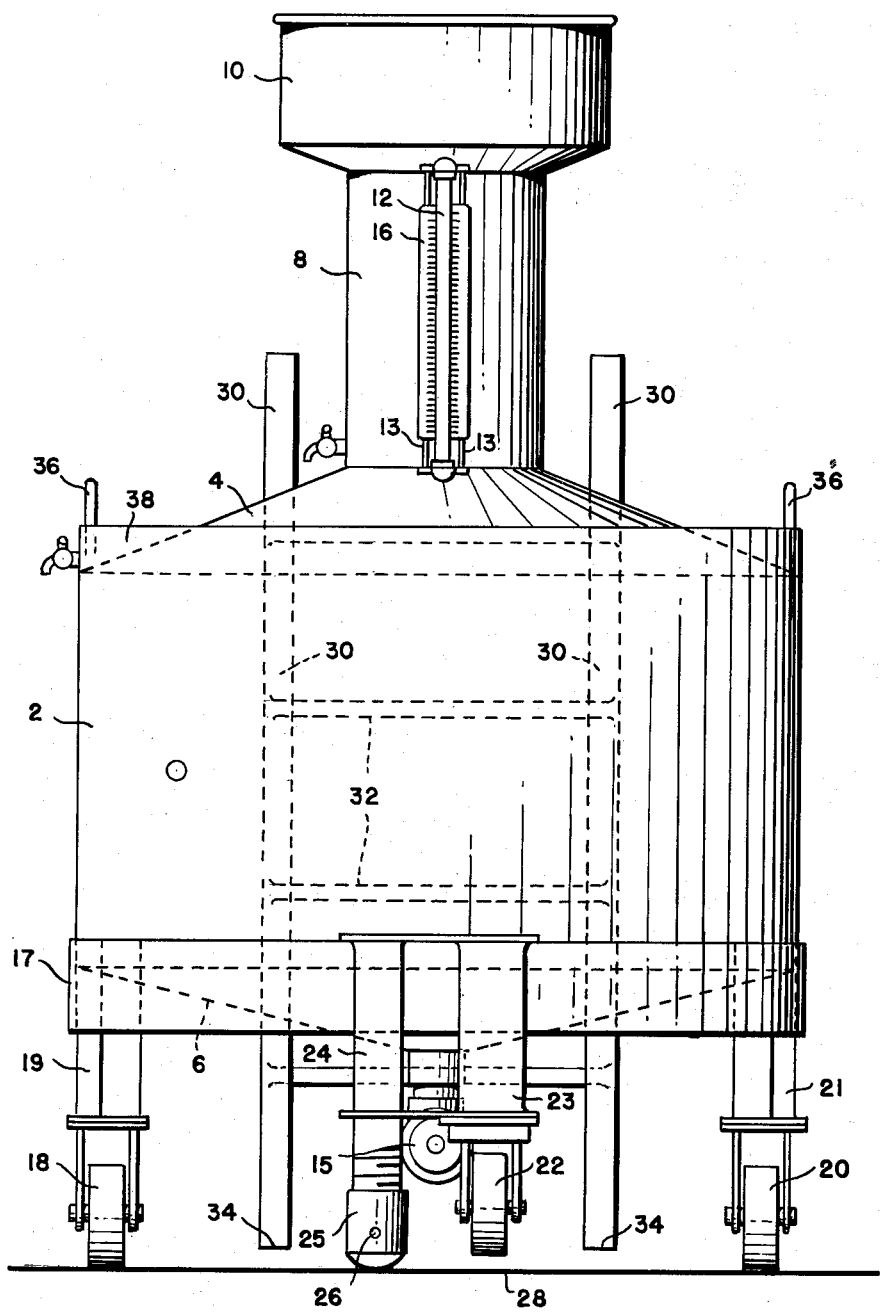
Figure 1 is a front elevation of the improved measuring device.
Figure 2:
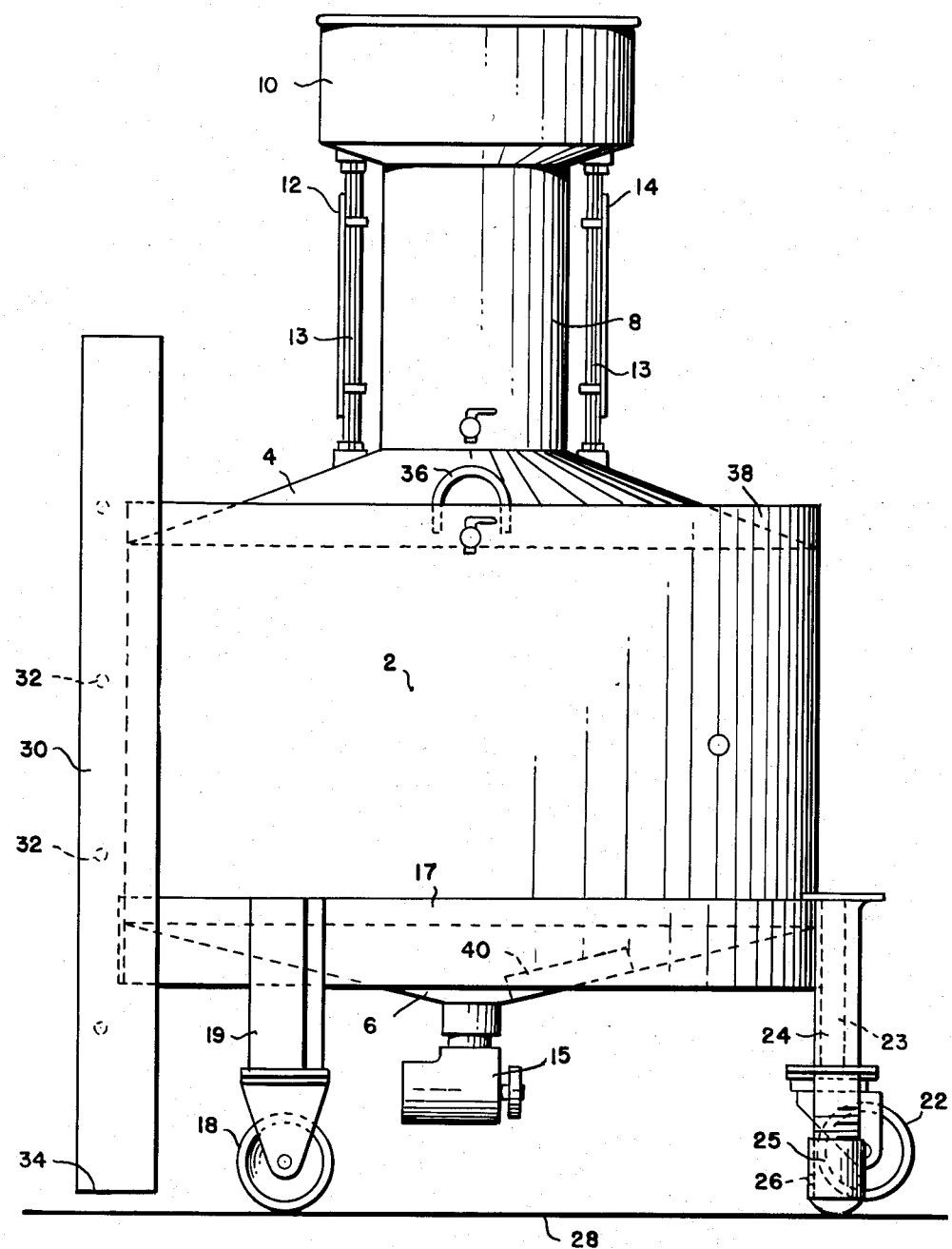
Figure 2 is a side elevation of the device shown in Figure 1.

Referring to the drawings there is shown at 2 a container body having a conical upper portion 4 and a conical base portion 6. A neck 8 forms an upper portion of the container and is mounted on the upper conical portion 4. The neck is of relatively small cross-sectional area with respect to the body and mounts at its upper end an enlarged portion 10 which serves as a funnel-like member facilitating the filling of the container neck and body. When measure is being filled at a high rate of speed, or a liquid such as furnace oil is used in a test, foaming or boiling over the top of the neck may be experienced. The funnel top of neck entraps this foaming and prevents test being voided.

A pair of graduated sight level gauges 12 and 14 are mounted externally of diametrically opposite portions of the neck 8. The gauges provide an indication of the level of liquid contained within the neck. These gauges each include a calibrated scale 16. The calibrated scales are each mounted on a pair of members 13 which are adjustably mounted in order that the calibration of the testing device may be accomplished. The calibrated scales are thereafter clamped in position and provision is preferably made for locking the scales and sealing them in final position in order to prevent any possibility of their being moved out of calibration. The structure of the mounting for these calibrated scales is described in detail in the above mentioned patent and does not form a part of the invention disclosed herein.

The container is mounted on wheels 18, 20 and 22 spaced approximately at 120° intervals around the base of the container body. The wheels 18 and 20 are non-swiveling and are attached to channel members 19 and 21, respectively, which are in turn mounted on an annular band 17 affixed to the lower portion of the container body. The third wheel 22 is provided with a swivel castor mounting which is attached to a channel member 23 which is in turn attached to the annular band 17.

Adjacent to the castor 22 and the mounting therefor is a member 24 which is also attached to the annular band 17 and mounts on the threaded lower end thereof a cap member 25. The cap member 25 is provided with a transversely extending bore 26. By inserting a pin through the bore in the cap member 25 and rotating the cap member, the castor 22 may be raised upwardly from a supporting surface 28 as shown in the drawings. It will be evident, of course, that by raising the cap member 25 on the member 24 the castor 22 will be lowered upon the supporting surface. The member 24 and the cap member 25 thus provide a means for not only providing approximate leveling of the container but, more essentially, provide means for preventing motion of the container while it is in use and a volumetric test is being conducted.

It is not essential that the container be level when tests are made because of the provision of the two sight gauges 12 and 14 which are positioned on diametrically opposite sides of the neck 8. It will be apparent that, if when the scales 16 were calibrated, they were properly positioned with the apparatus level, then any time thereafter when measurements are being made and the apparatus is not entirely level, a discrepancy of level will be immediately apparent in the two gauges and the average of the two readings will be the true level reading. If the inclination of the device is such that the readings of the two gauges are identical, the gauge readings will under those conditions both be representative of the average level taken transversely of the neck 8 and thus will each provide a true indication level. Thus the arrangement described greatly facilitates the making of measurements particularly with regard to a large apparatus in that exact leveling of the apparatus is not a critical matter.

In order to facilitate loading of the measuring device upon a truck or other conveyance, there is provided a skid in the form of a pair of vertically extending members 30 which are attached to the side of the container body 2 opposite to the castor 22 and jack cap 25. Spaced members 32 extending transversely between the skid members 30 provide rungs of a ladder in combination with the members 30 by means of which an operator may gain access to the neck and upper portion of the container.

The lower ends 34 of the skid members 30 terminate slightly above the ground level 28. The spacing between the ground level 28 and the lower ends of the skid members is sufficient to permit the castor 22 to be jacked up off the ground level as shown without contact of the ends of the skids with the ground level. It will be evident that this arrangement of parts permits the device to be freely rolled over the ground level 28 when the castor 22 is lowered onto the ground level.

The lower ends 34 of the skid members 30 are positioned sufficiently close to the ground that, when the castor 22 and the entire portion of the container body in the region of the castor 22 is raised upwardly so that both the castor 22 and the cap 25 are lifted from the ground, these lower end portions of the skid members will engage the ground and provide pivot points about which the entire device may be rotated as the device is rocked over. Thus the device may be conveniently rocked over against and drawn upwardly upon a truck on which the device may be conveniently transported from one testing location to another.

When the device has reached its destination, it may be slid along on the skid members 30 to the end of the truck and then rocked over the tailgate of a truck and lowered to the ground. The initial contact with the ground is had with the lower corners of the skid members 30, thus saving the wheels 18 and their bearings from the impact which would occur if they were permitted to strike the ground at this time. The device is then rocked over the lower ends of the skid bars bringing the wheels 18 and 20 gently into contact with the ground. Thereafter, the lower ends of the skid bars will rise upwardly from the ground as the opposite side of the container moves downwardly until either the castor 22 or the cap 25 come into engagement with the ground.

A pair of ring handles 36 are attached to a flange 38 which is provided by the outer wall of the container body extending upwardly above the upper conical top portion 4 thereof. These rings are provided to facilitate lifting or handling of the device by a crane or other suitable hoisting means.

It will be evident, however, that the provision of the skid members 30 and the jacking members 24 and 25 will make possible loading and unloading of the device on a truck and the moving of the device around a floor as well as the fixing of the device in movable position without necessitating the provision of hoisting means.

An upstanding baffle plate 40 is mounted internally of the conical bottom 6 of the body of the container to prevent swirling of the liquid within the container as it is being emptied through the bottom valve 15.

It will be evident from the foregoing that the invention provides a field standard volumetric measuring device of large capacity, i. e., of the order of 100 to 500 gallons or more capacity which may be conveniently loaded on a truck for long distance transportation and which, when positioned on its own wheels, may be moved for short distances. During its periods of use the device requires a minimum of space and does not detain a motor vehicle truck.

The apparatus further provides, when in use, gauge means which are accurately operable regardless of the fact that the device might be positioned on a non-level floor.

It will be evident that various modifications may be made in the embodiment of the invention disclosed herein without departing from the scope of the invention as set forth in the following claim.

What is claimed is:

A field standard volumetric measuring device comprising a container including a body and a neck of relatively small cross sectional area with respect to said body and extending upwardly therefrom when the device is in a vertical position, a sight level gauge for indicating level of liquid in said neck, wheels mounting said container in a vertical position and providing for movement thereof over a supporting surface, a skid attached to one vertically extending side of said container body and on which the device may be supported in a horizontal position, said skid being in the form of a pair of spaced members extending vertically when the device is in a vertical position and terminating sufficiently far above the supporting surface to permit the device to be moved on said wheels and terminating sufficiently close to the supporting surface so as to engage the supporting surface when the diametrically opposite side of said body is raised a substantial distance above the level normally maintained by said wheels, one of said wheels being positioned diametrically opposite to said skid, and jacking means positioned adjacent to said wheel to raise said wheel from the ground a sufficient distance to cause engagement of the lower end of said skid with said supporting surface, said skid members extending upwardly to the level of said neck and being joined by spaced transversely extending members to form a ladder providing access to said neck when the device is in a vertical position, and said jacking means providing for leveling of the device when the device is in a vertical position upon a supporting surface.

References Cited in the file of this patent

UNITED STATES PATENTS

| | | |
|---|---|---|
| 1,133,798 | Hall | Mar. 30, 1915 |
| 1,217,047 | Morris | Feb. 20, 1917 |
| 2,031,230 | Seraphin | Feb. 18, 1936 |
| 2,326,144 | Johnston | Aug. 10, 1943 |
| 2,624,590 | Tilton | Jan. 6, 1953 |

FOREIGN PATENTS

| | | |
|---|---|---|
| 731,852 | Germany | Feb. 17, 1943 |